(12) United States Patent
Lin et al.

(10) Patent No.: US 6,448,730 B1
(45) Date of Patent: Sep. 10, 2002

(54) METHOD AND APPARATUS FOR CONTROLLING CURRENT LIMIT OF A MOTOR

(75) Inventors: Rick Lin, Chang-Hua Hsien; Sheng-Lin Chiu, Nan-Tou Hsien, both of (TW)

(73) Assignee: Universal Scientific Industrial Co., Ltd., Nan-Tou Hsien (TW)

( * ) Notice: Subject to any disclaimer, the term of this patent is extended or adjusted under 35 U.S.C. 154(b) by 0 days.

(21) Appl. No.: 09/801,113
(22) Filed: Mar. 8, 2001
(51) Int. Cl.$^7$ .................... F02D 41/22; F02D 11/10
(52) U.S. Cl. ................ 318/434; 318/563; 318/626
(58) Field of Search ................ 318/139, 271, 318/432, 433, 434, 563, 566, 569, 626, 652; 123/319, 361, 376; 180/178, 170, 179

(56) References Cited

U.S. PATENT DOCUMENTS 4,549,121 A * 10/1985 Gale ..................... 318/139
6,291,955 B1 * 9/2001 Itabashi et al. ............. 318/434

* cited by examiner

Primary Examiner—Khanh Dang
(74) Attorney, Agent, or Firm—Finnegan, Henderson, Farabow, Garrett & Dunner, L.L.P.

(57) ABSTRACT

In a method and apparatus for controlling current limit of a motor of an electric-powered vehicle, the current limit of the motor is initially set to a smaller first value during start-up operation of the vehicle. Thereafter, in response to operation of a twist-grip throttle of the vehicle to commence accelerating operation of the vehicle subsequent to the start-up operation, the current limit of the motor is increased from the smaller first value to a larger second value larger than the smaller first value in accordance with angular rotation of the twist-grip throttle from an initial position. When the current limit reaches the larger second value, the current limit of the motor is then maintained at the larger second value in case of further operation of the twist-grip throttle from the initial position.

12 Claims, 2 Drawing Sheets

METHOD AND APPARATUS FOR CONTROLLING CURRENT LIMIT OF A MOTOR

BACKGROUND OF THE INVENTION

1. Field of the Invention

The invention relates to a current control apparatus for a motor of an electric-powered vehicle, more particularly to a method and apparatus for controlling the current limit of a motor so as to conserve battery energy, to improve endurance, to avoid sudden thrusting movement of the vehicle, and to protect the motor and other power components.

2. Description of the Related Art

Due to their being environmental friendly, electric-powered vehicles are ideal for short distance travel. However, in view of current battery technology, such vehicles have unsatisfactory endurance. There is thus a need to improve motor-operating efficiency in order to improve endurance.

It has been proposed heretofore to limit the amount of current to a motor of an electric-powered vehicle to a constant value when the latter is operated in a cruise mode so as to reduce energy consumption and minimize sudden thrusting movement of the vehicle, thus enhancing consumer appeal. The constant value is usually chosen to be the rated current value of the motor to avoid damage to the motor and other power components. However, limiting the amount of current to the rated current value of the motor results in waste of energy during start-up operation of the vehicle from a stationary state.

It has also been proposed heretofore to reduce the current limit of the motor of the electric-powered vehicle when overheating of the motor and other power components occurs or when braking. However, as the current limit is still the rated current value during start-up operation of the vehicle, the aforesaid drawback persists.

SUMMARY OF THE INVENTION

Therefore, the main object of the present invention is to provide a method and apparatus for controlling the current limit of a motor so as to conserve battery energy, to improve endurance, to avoid sudden thrusting movement of the vehicle, and to protect the motor and other power components.

According to a first aspect of the invention, a method for controlling current limit of a motor of an electric-powered vehicle comprises the steps of:

setting the current limit of the motor to a smaller first value during start-up operation of the vehicle;

in response to operation of a twist-grip throttle of the vehicle to commence accelerating operation of the vehicle subsequent to the start-up operation, increasing the current limit of the motor from the smaller first value to a larger second value larger than the smaller first value in accordance with angular rotation of the twist-grip throttle from an initial position; and when the current limit reaches the larger second value, maintaining the current limit of the motor at the larger second value in case of further operation of the twist-grip throttle from the initial position.

According to a second aspect of the invention, an apparatus for controlling current limit of a motor of an electric-powered vehicle comprises:

first means for setting the current limit of the motor to a smaller first value during start-up operation of the vehicle;

second means, in response to operation of a twist-grip throttle of the vehicle to commence accelerating operation of the vehicle subsequent to the start-up operation, for increasing the current limit of the motor from the smaller first value to a larger second value larger than the smaller first value in accordance with angular rotation of the twist-grip throttle from an initial position; and third means, when the current limit reaches the larger second value, for maintaining the current limit of the motor at the larger second value in case of further operation of the twist-grip throttle from the initial position.

According to a third aspect of the invention, an apparatus for controlling current limit of a motor of an electric-powered vehicle comprises:

a first diode having an anode adapted to receive a first signal corresponding to a smaller first value of the current limit, and a cathode;

a first operational amplifier unit having an input adapted to receive a second signal corresponding to a larger second value of the current limit, and an output, the larger second value being larger than the smaller first value;

a second diode having a cathode coupled to the output of the first operational amplifier unit, and an anode coupled to the cathode of the first diode;

a second operational amplifier unit having an input adapted to receive a third signal corresponding to angular rotation of a twist-grip throttle of the vehicle from an initial position, and an output; and a third diode having an anode coupled to the output of the second operational amplifier unit, and a cathode coupled to the cathode of the first diode;

the current limit of the motor being obtained from the cathode of the first diode.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

The preferred embodiment of a method for controlling the current limit of a motor of an electric-powered vehicle according to the present invention includes the steps of:

(a) setting the current limit of the motor to a constant smaller first value during start-up operation of the vehicle so as to ensure smooth and steady start-up movement of the vehicle;

(b) in response to operation of a twist-grip throttle of the vehicle to commence accelerating operation of the vehicle subsequent to the start-up operation, increasing the current limit of the motor from the smaller first value to a larger second value that is larger than the smaller first value such that the current limit varies linearly with respect to angular rotation of the twist-grip throttle from an initial position in order to prevent sudden thrusting movement of the vehicle; and (c) when the current limit reaches the larger second value, which preferably corresponds to the rated current value of the motor, maintaining the current limit of the motor at the larger second value in case of further operation of the twist-grip throttle from the initial position, thereby providing protection to the motor and other power components.

Figure 1:
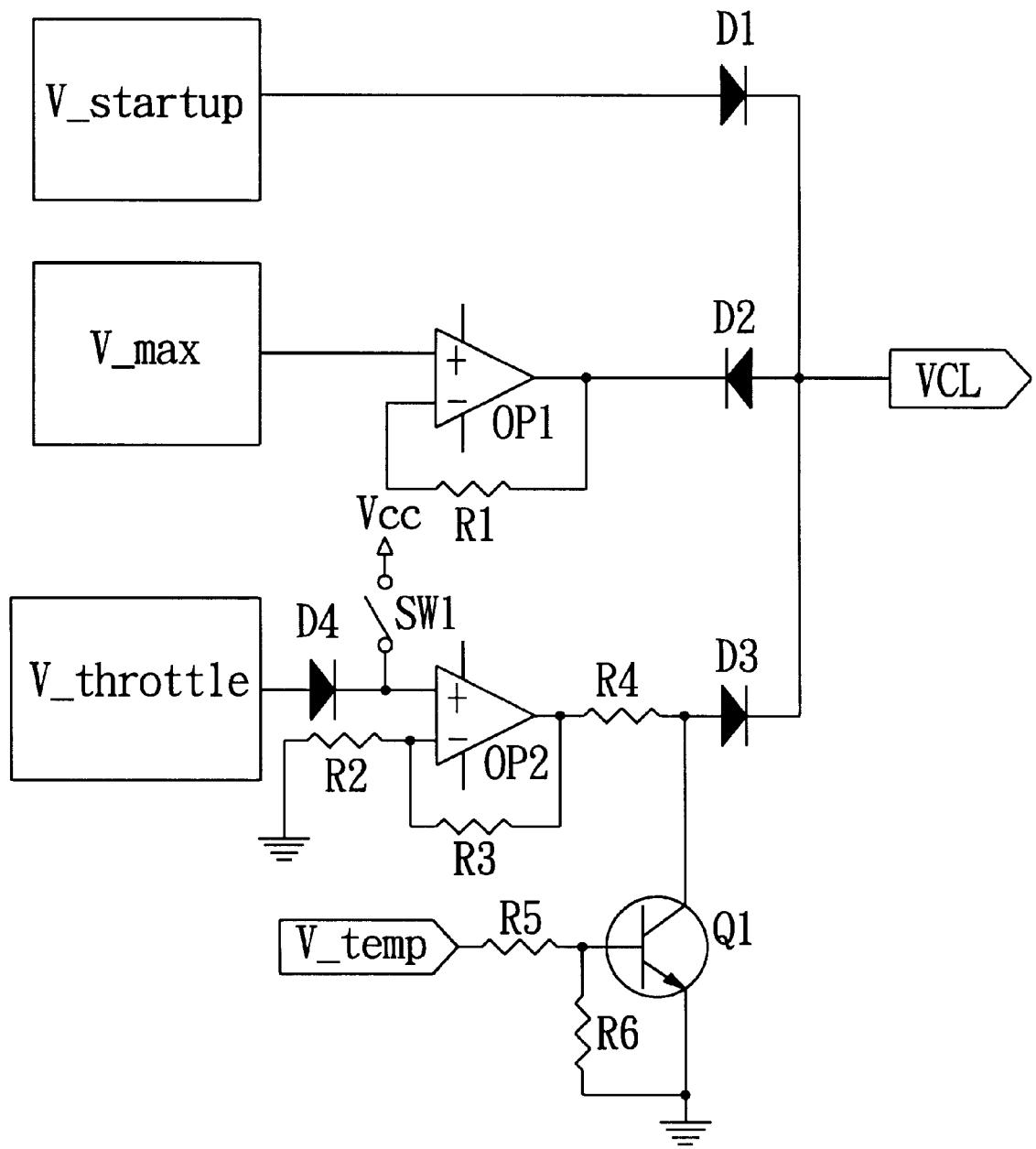
FIG. 1 is a schematic circuit diagram illustrating the preferred embodiment of an apparatus for controlling the current limit of a motor of an electric-powered vehicle, according to the present invention.

Referring to FIG. 1, the preferred embodiment of an apparatus for controlling the current limit of a motor of an electric-powered vehicle according to this invention is shown to include first, second, third and fourth diodes (D1, D2, D3, D4), and first and second operational amplifier units.

The first diode (D1) has an anode adapted to receive a first signal (V_startup) corresponding to a smaller first value of the current limit. The smaller first value typically corresponds to about 45 to 55% of a rated current value of the motor.

The first operational amplifier unit, which includes an operational amplifier (OP1) and a resistor (R1), has an input adapted to receive a second signal (V_max) corresponding to a larger second value of the current limit that is larger than the smaller first value and that preferably corresponds to the rated current value of the motor.

The second diode (D2) has a cathode coupled to an output of the first operational amplifier unit.

The second operational amplifier unit, which includes an operational amplifier (OP2) and gain-setting resistors (R2, R3), has an input adapted to receive a third signal (V_throttle) that varies linearly between the smaller first value and the larger second value according to angular rotation of a twist-grip throttle of the vehicle from an initial position.

The third diode (D3) has an anode coupled to an output of the second operational amplifier unit. The cathode of the first diode (D1), the anode of the second diode (D2), and the cathode of the third diode (D3) are coupled to each other such that the value (VCL) of the current limit of the motor can be obtained therefrom.

The fourth diode (D4) has an anode adapted to receive the third signal (V_throttle), and a cathode coupled to the input of the second operational amplifier unit.

A switch (SW1) is coupled to the cathode of the fourth diode (D4) and the input of the second operational amplifier unit, and is operable so as to make or break electrical connection between the input of the second operational amplifier unit and a voltage source (Vcc).

A resistor (R4) is disposed to couple the output of the second operational amplifier unit and the anode of the third diode (D3).

A transistor circuit is formed from a transistor (Q1), and resistors (R5, R6), and has an input adapted to receive a fourth signal (V_temp) corresponding to temperature of the motor and/or a controller thereof, and an output coupled to the anode of the third diode (D3).

Figure 2:
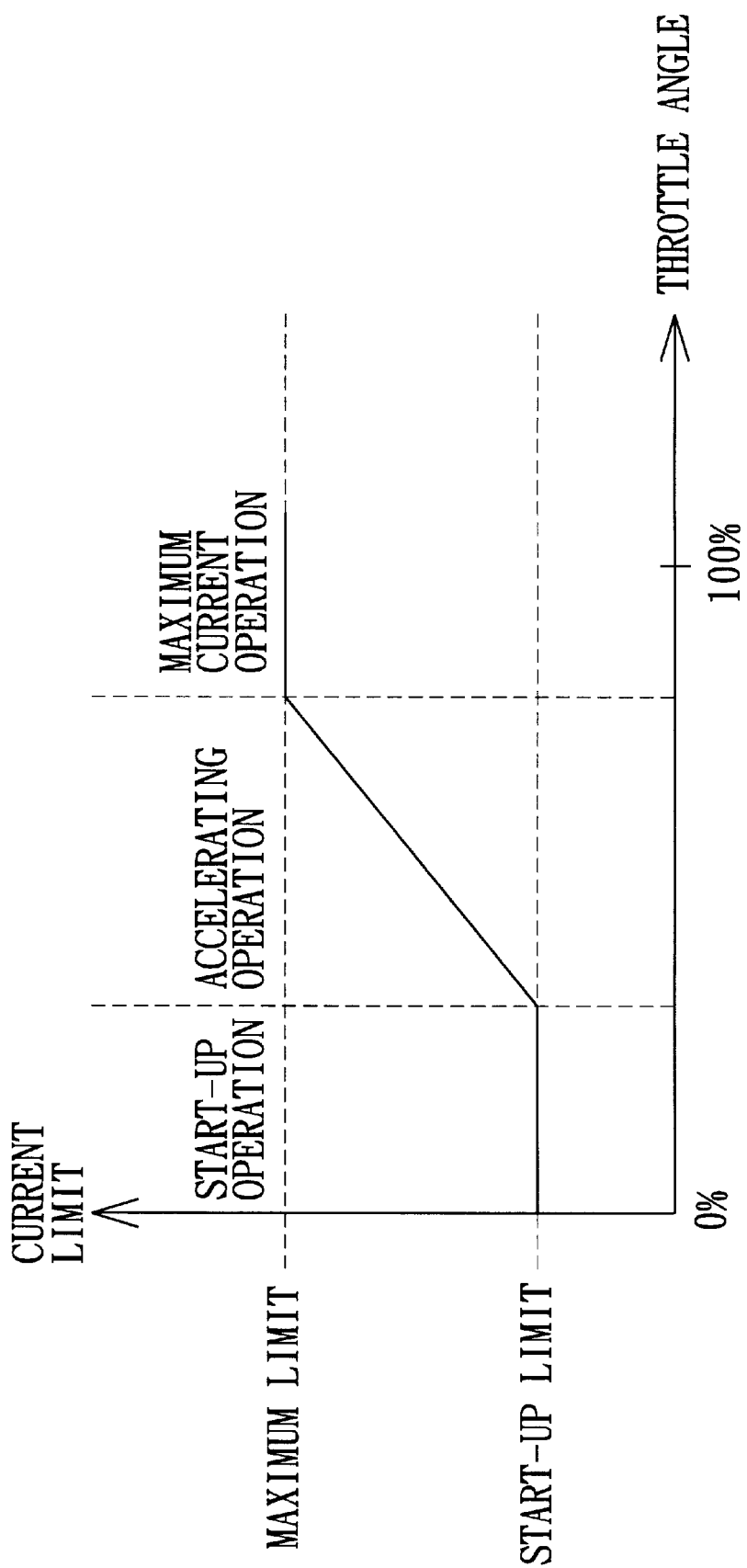
FIG. 2 is a plot to illustrate the relationship between the current limit of the motor and the throttle angle of the vehicle in accordance with the method of the preferred embodiment.

In use, the switch (SW1) is activated to select operation of the apparatus in one of a maximum speed mode or an energy-saving mode. When the switch (SW1) is turned ON, the maximum speed mode is selected, and the value (VCL) of the current limit is set to the larger second value, i.e. VCL=V_Max. When the switch (SW1) is turned OFF, the energy-saving mode is selected, and the value (VCL) of the current limit varies according to angular rotation of the twist-grip throttle in the manner shown in FIG. 2.

There are three possible operating regions in the energy-saving mode.

The first operating region is the start-up operating region. In this mode, the value (VCL) of the current limit of the motor is set to the constant smaller first value, i.e. VCL=V_startup, so as to ensure the generation of sufficient starting torque for smooth and steady start-up movement of the vehicle without incurring energy waste. During start-up, because the back electromotive force of the motor is negligible, there is no need to supply large currents, which can result in sudden thrusting movement and waste of energy, to the motor. By lowering the value (VCL) of the current limit during start-up operation, energy can be conserved, and endurance can be enhanced.

In the apparatus of the preferred embodiment, when V_throttle(1+R3/R2), which is the signal at the output of the second operational amplifier unit, is less than V_startup, VCL=V_startup due to the presence of the diodes (D1, D2, D3). As such, the start-up operating region is selected when the twist-grip throttle of the vehicle has yet to rotated by a predetermined angle from the initial position so as to ensure smooth and steady movement of the vehicle.

The start-up operating region is also selected when overheating of the motor and/or its controller occurs. Under such a condition, the fourth signal (V_temp), which is a temperature signal, is sufficient to trigger the transistor (Q1) into conduction such that VCL=V_startup regardless of the signal at the output of the second operational amplifier unit, thereby providing protection to the motor and other power components.

The second operating region in the energy-saving mode is the accelerating operating region. In this region, the value (VCL) of the current limit of the motor increases linearly between the smaller first value and the larger second value in response to further operation of the twist-grip throttle after start-up. As such, sudden thrusting movement of the vehicle can be prevented, and smooth accelerating movement of the vehicle can be ensured.

In the apparatus of the preferred embodiment, when V_throttle (1+R3/R2), which is the signal at the output of the second operational amplifier unit, is greater than V_startup, VCL=V_throttle(1+R3/R2). In other words, the value (VCL) of the current limit is equal to the third signal (V_throttle) multiplied by the gain (1+R3/R2) of the second operational amplifier unit.

The third operating region in the energy-saving mode is the maximum current operating region. In this region, the value (VCL) of the current limit of the motor is maintained at the larger second value to protect the motor and other power components. More particularly,

*VCL=V*_max+forward bias voltage across the third diode (*D3*)

*VCL=V*_throttle(1+*R3/R2*)–forward bias voltage across the second diode (*D2*)

When V_throttle(1+R3/R2) from the second operational amplifier unit is greater than the sum of V_max and the forward bias voltage across the third diode (D3), VCL will be limited to the sum of V_max and the forward bias voltage across the third diode (D3). Because both V_max and the forward bias voltage across the third diode (D3) are fixed, the value (VCL) will not change in the maximum current operating region in spite of further rotation of the twist-grip throttle from the initial position.

It has thus been shown that, in the method and apparatus of this invention, the current limit of a motor is controlled according to the starting torque requirement and the vehicle acceleration conditions so as to conserve battery energy, to improve endurance, to avoid sudden thrusting movement of the vehicle, and to protect the motor and other power components.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for controlling current limit of a motor of an electric-powered vehicle, comprising the steps of:
   (a) setting the current limit of the motor to a smaller first value corresponding to about 45% to 55% of a rated current value of the motor during start-up operation of the vehicle;
   (b) in response to operation of a twist-grip throttle of the vehicle to commence accelerating operation of the vehicle subsequent to the start-up operation, increasing the current limit of the motor from the smaller first value to a larger second value larger than the smaller first value in accordance with angular rotation of the twist-grip throttle from an initial position; and
   (c) when the current limit reaches the larger second value, maintaining the current limit of the motor at the larger second value in case of further operation of the twist-grip throttle from the initial position.

2. The method of claim 1, wherein in step (a), the smaller first value remains constant during the start-up operation of the vehicle.

3. The method of claim 1, wherein in step (b), the current limit varies linearly with respect to the angular rotation of the twist-grip throttle.

4. The method of claim 1, wherein the larger second value corresponds to the rated current value of the motor.

5. The method of claim 1, further comprising the step of:
   (d) setting the current limit of the motor to the smaller first value upon detection of an overheating condition.

6. An apparatus for controlling current limit of a motor of an electric-powered vehicle, comprising:
   first means for setting the current limit of the motor to a smaller first value corresponding to 45% to 55% of a rated current value of the motor during start-up operation of the vehicle;
   second means connected to the first means, in response to operation of a twist-grip throttle of the vehicle to commence accelerating operation of the vehicle subsequent to the start-up operation, for increasing the current limit of the motor from the smaller first value to a larger second value larger than the smaller first value in accordance with angular rotation of the twist-grip throttle from an initial position; and
   third means connected to the first and second means, when the current limit reaches the larger second value, for maintaining the current limit of the motor at the larger second value in case of further operation of the twist-grip throttle from the initial position.

7. The apparatus of claim 6, wherein said second means varies the current limit linearly with respect to the angular rotation of the twist-grip throttle.

8. The apparatus of claim 6, wherein the larger second value corresponds to the rated current value of the motor.

9. The apparatus of claim 6, further comprising:
   fourth means connected to the second means for setting the current limit of the motor to the smaller first value upon detection of an overheating condition.

10. An apparatus for controlling current limit of a motor of an electric-powered vehicle, comprising:
    a first diode having an anode adapted to receive a first signal corresponding to a smaller first value of the current limit, and a cathode;
    a first operational amplifier unit having an input adapted to receive a second signal corresponding to a larger second value of the current limit, and an output, the larger second value being larger than the smaller first value;
    a second diode having a cathode coupled to said output of said first operational amplifier unit, and an anode coupled to said cathode of said first diode;
    a second operational amplifier unit having an input adapted to receive a third signal corresponding to angular rotation of a twist-grip throttle of the vehicle from an initial position, and an output; and
    a third diode having an anode coupled to said output of said second operational amplifier unit, and a cathode coupled to said cathode of said first diode;
    the current limit of the motor being obtained from said cathode of said first diode.

11. The apparatus of claim 10, further comprising:
    a fourth diode having an anode adapted to receive the third signal, and a cathode coupled to said input of said second operational amplifier unit; and
    a switch coupled to said cathode of said fourth diode and said input of said second operational amplifier unit and operable so as to make or break electrical connection between said input of said second operational amplifier unit and a voltage source.

12. The apparatus of claim 10, further comprising:
    a resistor disposed to couple said output of said second operational amplifier unit and said anode of said third diode; and
    a transistor circuit having an input adapted to receive a fourth signal corresponding to motor temperature, and an output coupled to said anode of said third diode.

* * * * *